(12) United States Patent  
Otsuki

(10) Patent No.: US 6,325,862 B1
(45) Date of Patent: *Dec. 4, 2001

(54) METHOD FOR REMOVING STAINS FROM STRUCTURAL SURFACES

(75) Inventor: Yoshio Otsuki, Fukuoka-ken (JP)

(73) Assignee: Kabushiki Kaisha Hanogumi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/692,890

(22) Filed: Oct. 20, 2000

Related U.S. Application Data

(62) Division of application No. 09/392,020, filed on Sep. 8, 1999, now Pat. No. 6,171,406.

(30) Foreign Application Priority Data

Sep. 9, 1998 (JP) .................................................. 10-255422

(51) Int. Cl.$^7$ ........................................................ B08B 3/02
(52) U.S. Cl. ..................... 134/7; 134/6; 134/8; 134/22.1; 134/22.16; 134/22.19; 134/36; 134/40; 134/42; 510/240; 510/475; 510/476; 510/365; 510/480
(58) Field of Search ............................. 134/6, 7, 8, 22.1, 134/22.16, 22.19, 36, 40, 42; 510/240, 475, 476, 365, 480

(56) References Cited

U.S. PATENT DOCUMENTS

| | | | |
|---|---|---|---|
| 3,817,958 | 6/1974 | Moyer | 260/86.7 |
| 4,417,992 | 11/1983 | Bhattacharyya et al. | 252/88 |
| 4,650,598 | 3/1987 | Roberts et al. | 252/88 |
| 5,344,903 | 9/1994 | Raiford et al. | 526/245 |
| 5,560,832 | 10/1996 | Sivakumar et al. | 210/708 |
| 5,643,462 | 7/1997 | Chen et al. | 210/730 |
| 5,648,116 | 7/1997 | Roe et al. | 427/136 |
| 5,681,399 | 10/1997 | Okano | 134/4 |
| 5,730,882 | 3/1998 | Gallup et al. | 210/708 |
| 5,798,046 | 8/1998 | Greer et al. | 210/705 |
| 5,904,735 | 5/1999 | Gutierrez et al. | 08/137 |
| 6,171,406 | * 1/2001 | Otsuki | 134/7 |

* cited by examiner

Primary Examiner—Sharidan Carrillo
(74) Attorney, Agent, or Firm—Price, Heneveld, Cooper, DeWitt & Litton

(57) ABSTRACT

A method for removing a stain from a surface of a structure which includes the steps of spraying an aggregating agent comprising a cationic linear organic polymer onto the surface of such structure having a stain produced thereon, dissociating the stain particles by use of Coulomb force f generated between the stain particles and the aggregating agent, displacing slightly the stain particles along the surface of the structure to cause peeling thereof from the surface to be cleaned, and simultaneously, aggregating the same for cleaning. Another embodiment includes maintaining water permeability of a road by easily eliminating a stain adhering to the surfaces of granular aggregate particles forming a drainage-type pavement layer of a road without the use of various mechanical tools. Other embodiments include the steps of depositing an aggregating agent for soil improvement comprising a cationic organic polymer onto a drainage-type pavement layer of a road, and eliminating the aggregated stain particles adhering to the surfaces of the granular aggregate particles constituting the drainage-type pavement layer and settling in voids.

13 Claims, 8 Drawing Sheets

METHOD FOR REMOVING STAINS FROM STRUCTURAL SURFACES

CROSS REFERENCE TO RELATED APPLICATION

This application is a divisional of U.S. application Ser. No. 09/392,020, filed Sep. 8, 1999, which has issued as U.S. Pat. No. 6,171,406 B1.

BACKGROUND OF THE INVENTION

1. Field of the Invention

The present invention relates to a method of maintenance of an ordinary structure such as a house, a bridge, a gravestone, a fence, a guard rail or a building through cleaning of a stain caused by molds and dust adhering to the surface thereof.

More particularly, the present invention relates to a method of maintenance through cleaning of a surface of a wooden outer wall, a wood block, a stone-built construction, a concrete structure, a tile, a slate, a glass plate, a roofing tile, plastics, mortar, a steel plate, etc. constituting the above-mentioned various structures.

Further, the invention relates to a method of maintenance of a structure such as a road or a road tunnel through improvement of permeability of rainwater falling onto a motorway for traffic of various motor vehicles and onto a footway for passage of general pedestrians, through cleaning a stain adhering to the road surface, etc.

More specifically, the invention relates to a method of maintenance for constantly keeping water permeability and drainage on a satisfactory level through prevention of frost of rainwater having entered voids of a porous material forming the surface course of a permeably paved road, or through removal of clogging caused by fine dust occurring from wear of tires of a running automobile or sand and dust contained in the air, coming into voids of pavement formed by a porous material.

2. Description of the Related Art

It has been the conventional practice of maintenance of a structure such as a building and a paved road to spray an organic solvent or an organic chemical detrimental to human health onto a stain on the surface of a surface to be cleaned, or polish or grind the same with a mechanical cleaning tool by a cleaning operator.

This method of maintenance, requiring a long period of time from the start of spraying of the organic solvent or the organic chemical, or from the start of polishing or grinding until the end of cleaning, is low in efficiency. Further, side effects and an offensive odor of the solvent or the chemical, and scattering of fine dust may result in deterioration of sanitary environments not only for cleaning operators, but also for inhabitants living near the site or for flora and fauna.

As a result, the cleaning operators, the inhabitants in the neighborhood of the site, and flora and fauna are exposed to a serious risk caused by the organic solvent, the organic chemical and the mechanical tools.

Maintenance such as cleaning of a permeable road or a drainage-type road has conventionally been accomplished mechanically by use of various mechanical cleaning devices such as a sweeping truck, a high-pressure cleaner, a brush and a vacuum truck to remove a stain adhering to the road surface.

For the purpose of preventing frost of rainwater staying on the road surface and rainwater coming into voids of the surface course thereof in winter, it is the common practice to sprinkle an aqueous solution of one or more salts selected from calcium chloride, magnesium chloride and sodium chloride in large quantities onto the road surface for thawing.

An object of the present invention is to improve sanitary environment without exerting an adverse effect on health of cleaning operators and inhabitants living near the site while avoiding inefficient cleaning operation including spraying of an organic chemical detrimental to human health and polishing with a mechanical cleaning tool employed in the conventional cleaning method.

Another object of the invention is to permit avoidance of direct touch of hands with the dirt or of a difficult or dangerous work, hated by cleaning operators.

Still another object of the invention is to avoid the necessity of mechanical cleaning tools as compared with the conventional mechanical cleaning of a road with various mechanical cleaning tools.

A further object of the invention is to prevent an aqueous solution of the salts as mentioned above from causing a salt damage to running vehicles, a river, a house or a plant near the road as compared with the method of maintenance of sprinkling the solution of the aforementioned salts in large quantities onto the road surface.

SUMMARY OF THE INVENTION

The method of maintenance of a structure including a building of the present invention comprises the steps of spraying an aggregating agent for soil improvement comprising a cationic linear organic polymer in mixture with water and a higher-alcoholic surfactant onto a stain on a surface to be cleaned, thereby displacing particles forming the stain along the surface to be cleaned by the use of Coulomb force acting between the particles and the aggregating agent to form aggregated particles.

The method of maintenance of a structure such as a drainage-type paved road of the present invention comprises the steps of applying or depositing an aggregating agent for soil improvement comprising a cationic linear organic polymer in mixture with water and a higher-alcoholic surfactant onto the surface of a road having a stain adhering thereto, and displacing the stain along the surface of the structure such as the road by the use of Coulomb force acting between particles forming the stain adhering to the road and particles forming the aggregating agent, i.e., forming aggregated particles through sliding to ensure easy peeling from the road surface or the granular aggregate.

These aspects of the present invention will be more clearly understood from the following description made with reference to the drawings.

DESCRIPTION OF THE PREFERRED EMBODIMENTS

Figure 1:
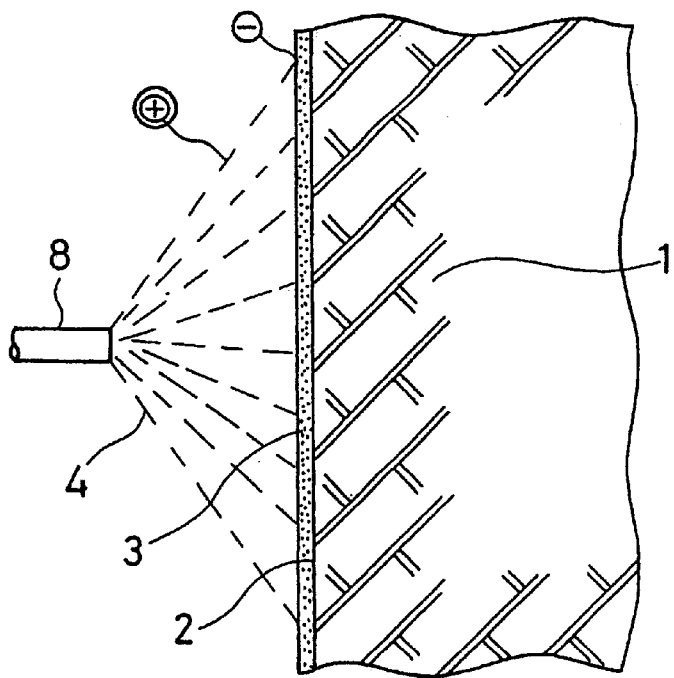
FIG. 1 is a longitudinal sectional view illustrating the method of maintenance of the present invention.

A method of maintenance of a structure 1 suitable for applying the present invention comprises the steps of spraying an aggregating agent 4 for soil improvement comprising a cationic linear organic polymer in an aqueous solution onto a stain 3 caused by molds and dust adhering to a surface to be cleaned 2, and forming aggregated particles 6 by displacing particles of the stain 3 by about 1 to 5 mm ($\Delta x$) on the surface to be cleaned 2 by the use of Coulomb force f acting between the aggregating agent 4 having positive charge and the particles of the stain 3 having negative charge. The displacement $\Delta x$ causes peeling of the stain 3 particles from the surface to be cleaned 2, which are blown off by the spraying force of the cationic aggregating agent 4 sprayed from a spray nozzle 8.

Figure 2:
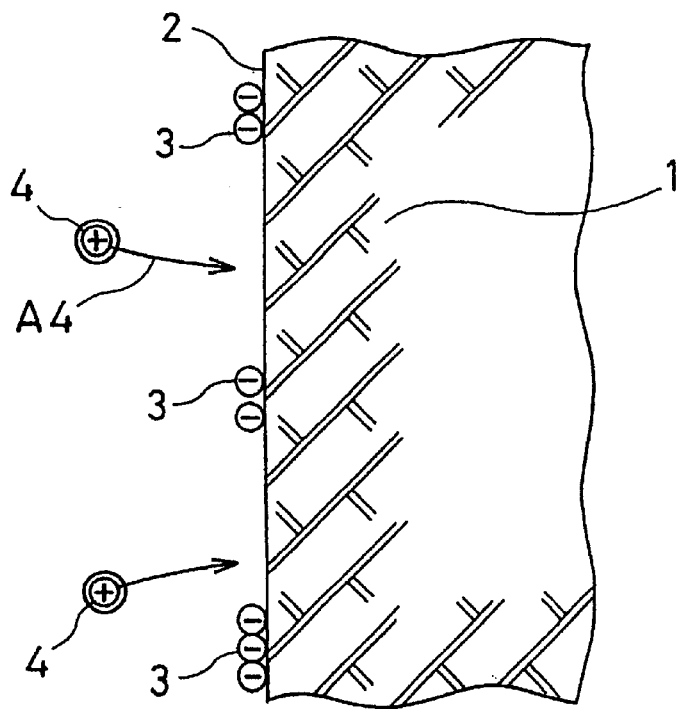
FIG. 2 is an enlarged view of a part of FIG. 1.
Figure 3:
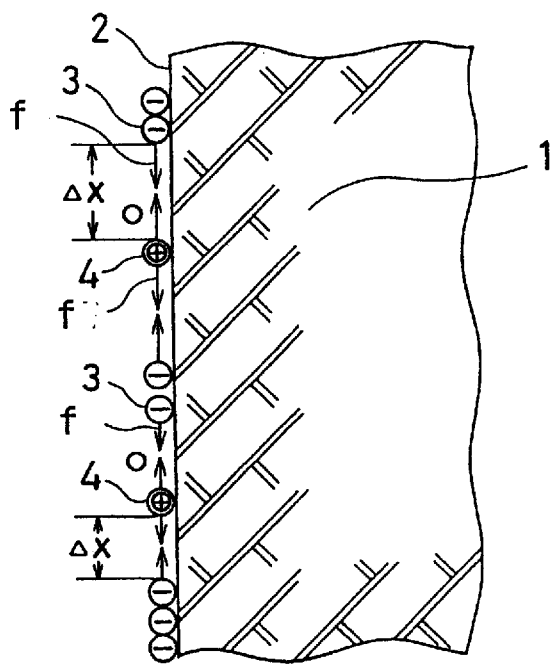
FIG. 3 is a view illustrating another state of the part shown in FIG. 2.

As shown in FIG. 2, the aggregating agent 4 having positive charge comprising a cationic linear organic polymer in the form of a 1,000 aqueous solution is sprayed in the arrow A4 direction onto the surface to be cleaned 2 having the stain 3 of negative charge adhering thereto to deposit the same onto the surface to be cleaned 2. Coulomb force f acts between the negative charge particles forming the stain 3 and the aggregating agent 4 as shown in FIG. 3, and a sucking force is generated.

The stain 3 particles having negative charge are consequently sucked along the surface to be cleaned 2 toward the aggregating agent 4 having positive charge.

Figure 4:
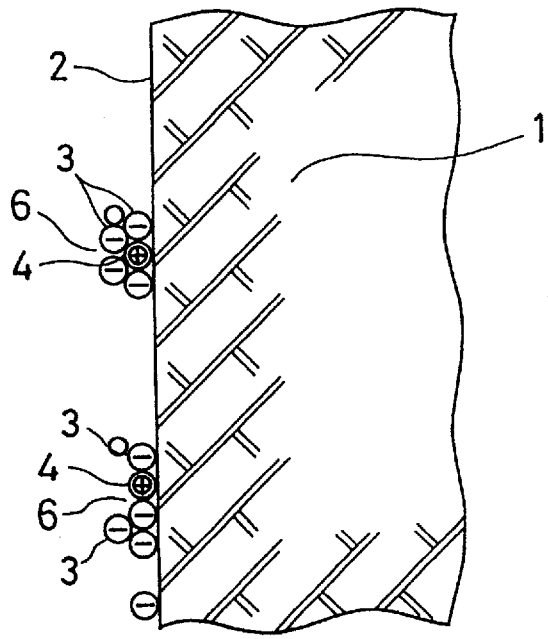
FIG. 4 is a view illustrating another state of the part shown in FIG. 3.
Figure 5:
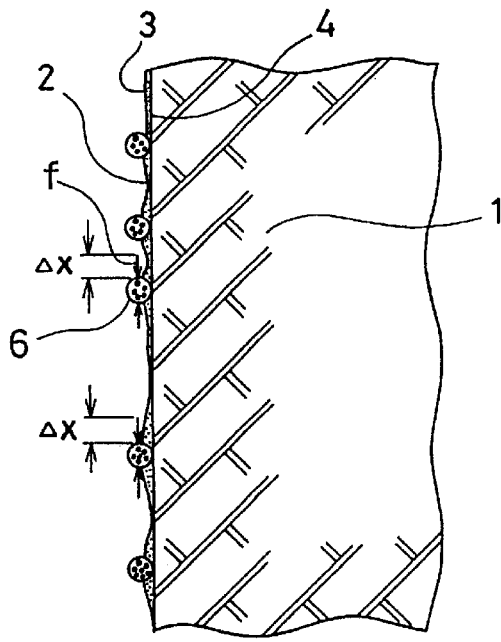
FIG. 5 is a view illustrating another state of the part shown in FIG. 4.

Under the effect of this sucking force, the particles 3 are slightly displaced by $\Delta x$ on the surface to be cleaned 2 as shown in FIG. 4 and come into contact with the aggregating agent 4 having positive charge while being peeled off from the surface to be cleaned 2, thus instantaneously form aggregated particles 6 as shown in FIGS. 4 and 5.

Figure 6:
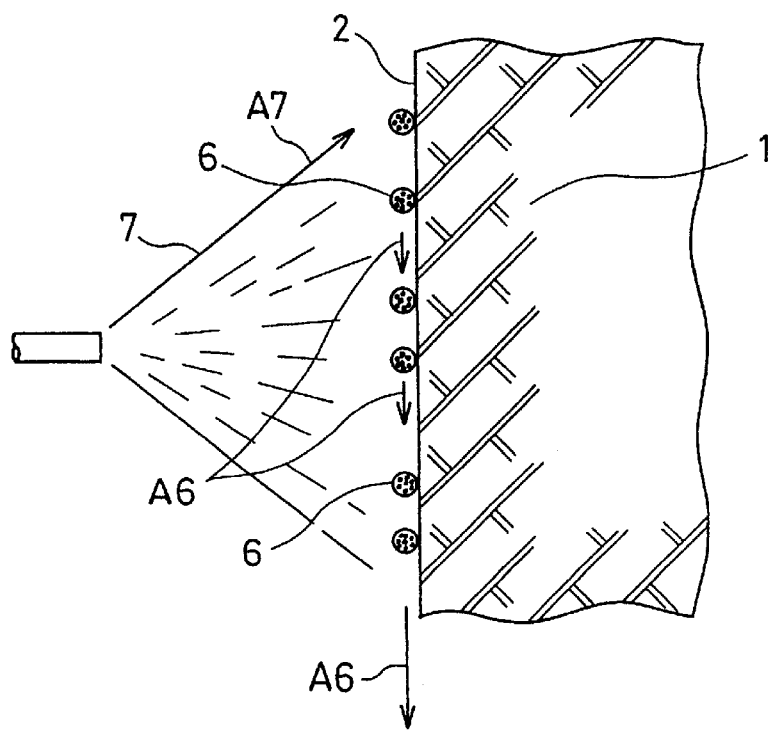
FIG. 6 is a view illustrating another state of the part shown in FIG. 1.

When further cleaning is required thereafter, a pressure applied water 7 in the form of an eddy flow is sprayed onto the surface to be cleaned 2 having the aggregated particles 6 formed thereon, in the arrow A7 direction as shown in FIG. 6 to wash off the aggregated particles 6 in the arrow A6 direction.

According to the present invention as described above, the operator can perform cleaning rapidly with an agreeable operability at a low cost, because it is possible to carry out cleaning by spraying the aggregating agent for soil which permits operation from a remote position and does not cause deterioration of the surrounding environment, safely without using an organic solvent or an organic chemical or without the need of conducting a manual wiping operation by the use of a polishing machine disliked by operators.

EXAMPLE 1

The following aggregating agent for soil improvement comprising a cationic linear organic polymer dissolved in an aqueous solution of a surfactant was sprayed at a rate of 5 to 7 liters per minute for about ten minutes onto a stain 3 comprising molds and dust on a surface of a wooden outer wall having an area of 40 $m^2$ composing a structure 1. There was obtained a result of cleaning equal to a conventional cleaning carried out by three operators for 1.5 days through four runs of cleaning.

Further, no phenomenon of a nappy surface of the wooden outer wall was observed.

Aggregating agent (Product name: EB-A) (made by Hayashi Kagaku Kogyo Co., Ltd.)

Feature
1: Having positive charge; reacting instantaneously with particles forming soil of negative surface charge; and aggregated into aggregated particles;
2: A chain-shaped organic polymer having a long molecular length; bonding by charge, further linked, and crosslinked to form a steric net structure;
3: Causing agglutination of fine particles by acting on sand and aggregation of soil and sand as a whole, thus increasing erosion resistance of the surface;
4: Improving water retainability and gas permeability through aggregation of soil in a chemically neutral environment.

Main constituents: A composite compound of magnesium salt of dimethylaminoethyl acrylate-methacrylate copolymer and polyethyleneimine.

Viscosity: 3000–9000 CP (at 25° C.)

pH: 5–7

Solubility: Capable of being mixed with water at any ratio

Exterior view: Almost transparent colorless viscous liquid

Surfactant (Product name: NEWOSMACK) (made by Hayashi Kagaku Kogyo Co., Ltd.)

A method of maintenance of a structure such as a drainage-type paved road suitable for application of the invention will now be described with reference to FIGS. 7–15.

Figure 7:
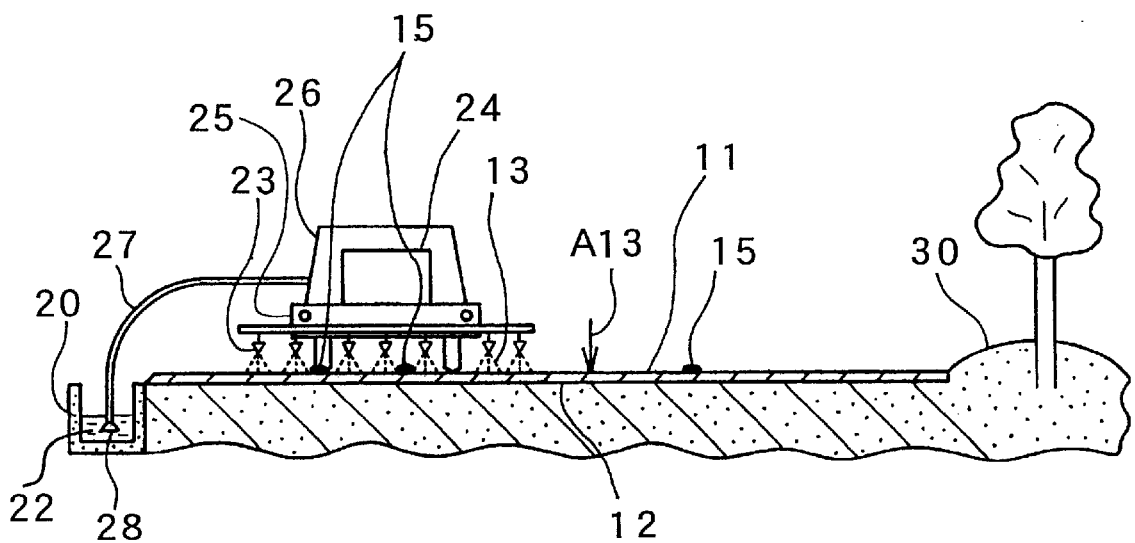
FIG. 7 is a rear view illustrating an embodiment of the invention.
Figure 8:
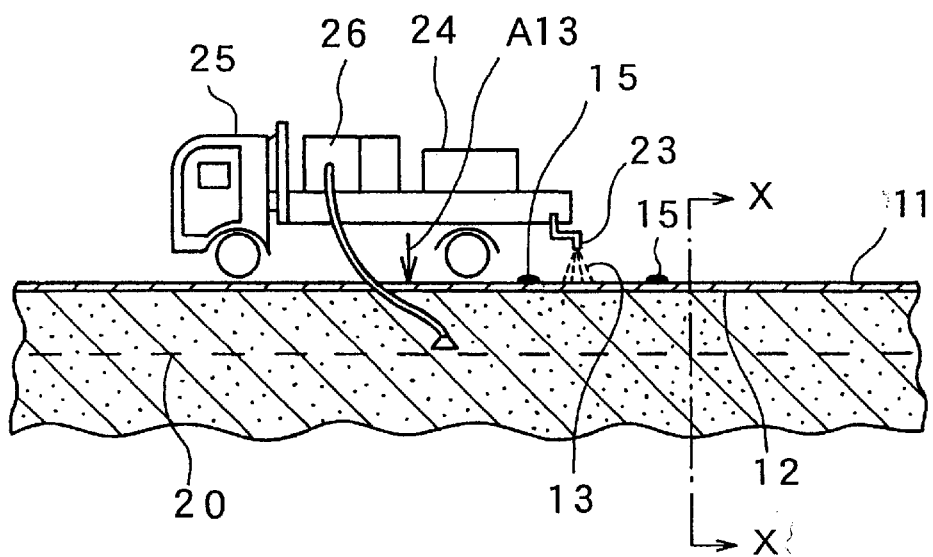
FIG. 8 is a left side view of FIG. 7.

As shown in FIGS. 7 and 8, an aggregating agent 13 for soil improvement comprising a cationic linear organic polymer in the form of an aqueous solution was spray-deposited from a spray nozzle 23 in the arrow A13 direction onto the upper surface of a drainage-type pavement layer 12 forming a base course of a road 11, and a stain 15 adhering to the surface of the drainage-type pavement layer 12 is aggregated under electrostatic action of the aggregating agent 13.

This state will be described with reference to the enlarged views FIGS. 10 to 14. The road 11 comprises a non-permeable pavement layer 16 and the drainage-type pavement layer 12 formed thereon. The drainage-type pavement layer 12 forms voids 18 between a number of granular aggregate particles 17.

Figure 10:
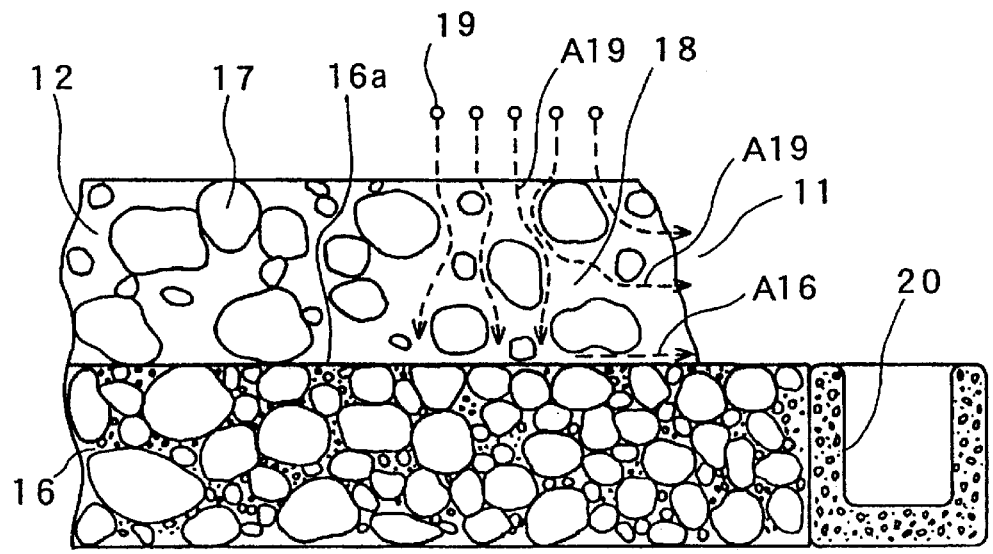
FIG. 10 is an enlarged sectional view of FIG. 8 cut along the line X—X.

In this state immediately after execution of a new road as described above, no stain such as dust adheres to the surfaces of the granular aggregate particles 17 as shown in FIG. 10, and no clogging takes place in the voids 18. Rainwater 19 having fallen onto the road therefore flows in the arrow A19 direction through the voids 18 between the granular aggregate particles 17, further flows in the arrow A16 direction along the upper surface 16a of the non-permeable pavement layer 16 under the effect of a road gradient inclining downward from a medial strip 30 toward a gutter 20, and flows into the gutter 20.

Figure 11:
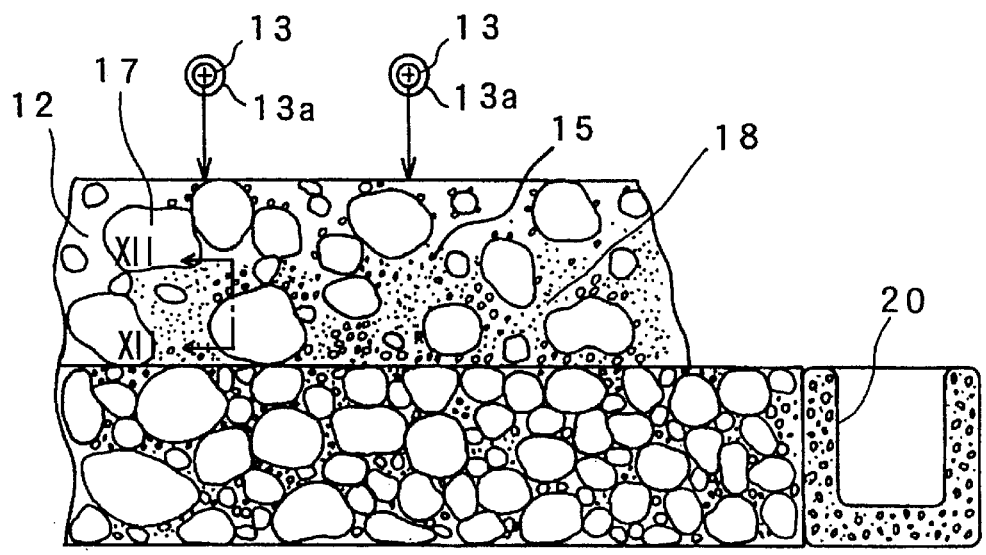
FIG. 11 is a sectional view illustrating another state of the part shown in FIG. 10.

However, after the lapse of a certain period of time from running of automobiles, etc. on the road 11, powder particles occurring from wear of tires and sand and dust adhere to the surface of the drainage-type pavement layer 12, or enter the voids 18 and adhere to the surface of the granular aggregate particles 17 as shown in FIG. 11, thus causing clogging of the voids 18 of the drainage-type pavement layer 12. As a result, rainwater does not flow into the gutter 20, but overflows on the road surface or is frozen in winter and may impair smooth traffic of automobiles.

Figure 12:
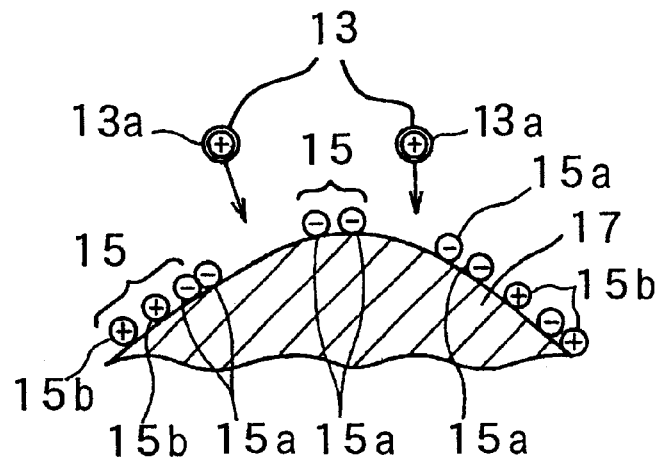
FIG. 12 is an enlarged sectional view of FIG. 11 cut along the line XII—XII.
Figure 13:
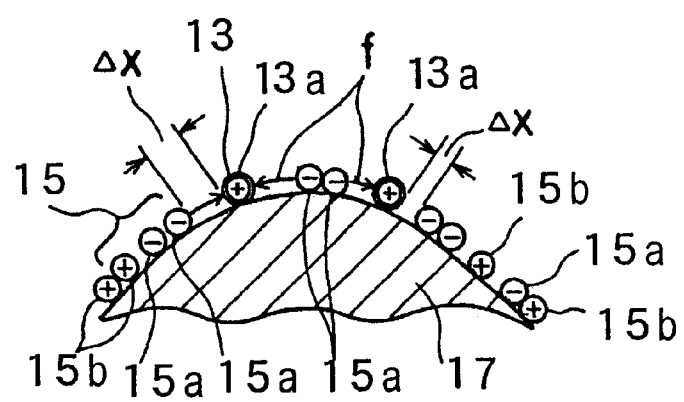
FIG. 13 is a sectional view illustrating another state of the part shown in FIG. 12.
Figure 14:
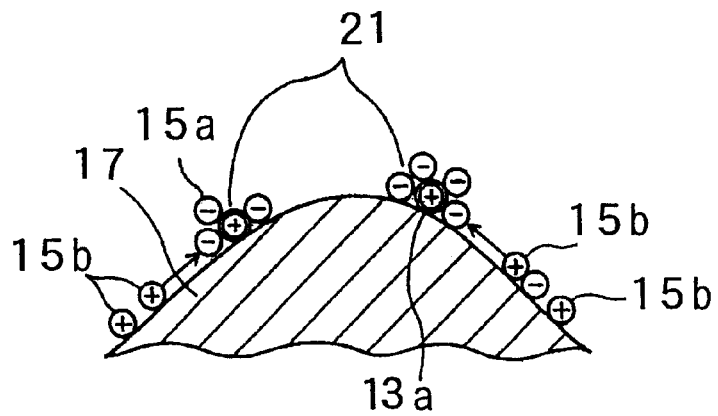
FIG. 14 is a sectional view illustrating another state of the part shown in FIG. 13.

In the invention, as described above, the aqueous solution of the aggregating agent 13 is sprayed onto the surface of the drainage-type pavement layer 12 of the road 11 as shown in FIG. 11. This state is illustrated in the enlarged views given in FIGS. 12 to 14. When cationic particles 13a composing the aggregating agent 13 having cationic charge are sprayed onto anionic particles 15a composing the stain 15 adhering to the surfaces of the granular aggregate particles 17 as shown in FIG. 12, Coulomb force f acts between the cationic particles 13a and the neighboring anionic particles 15a, thus causing a slight displacement $\Delta x$ in direction to cationic particles 13a. This displacement $\Delta x$ reduces the adhering force of the anionic particles 15a to the surfaces of the granular aggregate particles 17, instantaneously forming aggregated particles 21 as shown in FIG. 14.

In the meantime, the cationic particles 15b forming the stain 15 are attracted by the charge of the anionic particles 15a composing the aggregated particles 21, adhere to the aggregated particles 21 to cause coarsening thereof.

Figure 15:
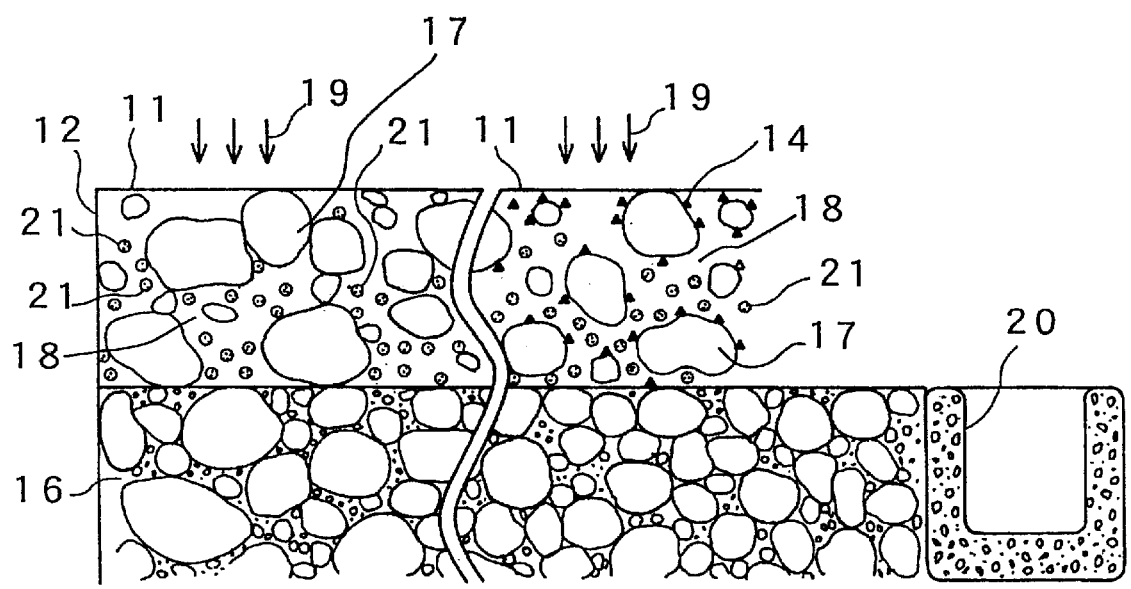
FIG. 15 represents a sectional view of the part shown in FIG. 11 in the state shown in FIG. 14 in the left half, and a sectional view in another state in the right half.

When rainwater or the like drops onto the surface of the drainage-type pavement layer 12 in this state, the aggregated particles 21 peel off from the surfaces of the granular aggregate particles 17, flow into the voids 18 as shown in the left half of FIG. 15, and finally flow out along the upper surface of the non-permeable pavement layer 16 toward the gutter 20.

As a result, the stain 15 is eliminated from the voids 18 in the drainage-type pavement layer 12 thereafter. Rainwater no more overflows on the surface of the road 11, and no more is it frozen in winter, thus eliminating the risk of impairing smooth traffic of automobiles.

In the invention, furthermore, the surface of the road may be sucked with a vacuum truck or the like to remove the aggregated particles 21 from the voids 18, in place of pouring the aggregated particles 21 into the gutter 20 by use of rainwater or by water supply onto the road 11.

Even when rainwater 19 remains in the voids 18 as shown in the right half of FIG. 15, freezing can be prevented by the action of calcium chloride 14 by previously spraying a mixture of the aggregating agent 13 and calcium chloride 14 upon spraying the aggregating agent 13 onto the road 11 as shown in FIG. 11.

Filthy water 22 containing the stain 15 having passed through the voids 18 between the granular aggregate particles 17 and entered into the gutter 20 along the upper surface of the non-permeable pavement layer 16 is sucked from a sucking port 28 of a sucking pipe 27 of a pump 26 mounted on a road control truck 25 as shown in FIGS. 7 and 8, and separated by a separator not shown on the road control truck 25. The remained wash water is stored in a water tank 24 serving also as a separator-type tank for reuse for an aqueous solution of the aggregating agent.

Even when detrimental substances toxic to human health contained in exhaust gases from ordinary automobiles run-ning on the road are contained in the stain 15, in this case, it is possible to separate only the stain 15 from the wash water, thus permitting minimization of the toxic substances, and this is favorable for subsequent treatments.

According to the invention as described above, even when the stain 15 entering the voids 18 formed in the drainage-type pavement layer 12 causes clogging, it is possible to restore draining property by easily removing the stain under electrostatic effect without the need to use various mechanical tools as in the conventional art.

It is hence possible to prevent an automobile accident from occurring from splash of water remaining on the surface of the drainage-type pavement layer 12 or slippage on the road surface caused by freezing.

The effect of preventing freezing can further be improved by previously mixing salts or an aqueous solution of salts with the aqueous solution of the aggregating agent and the surfactant.

Even detrimental substances are contained in the stain 15 adhering to a road, a building, etc., the detrimental substances can be made aggregated particles, easily washed off with wash water, and thus separated and isolated from the wash water, thus permitting prevention of the risk to human health caused by the detrimental substances.

Figure 9:
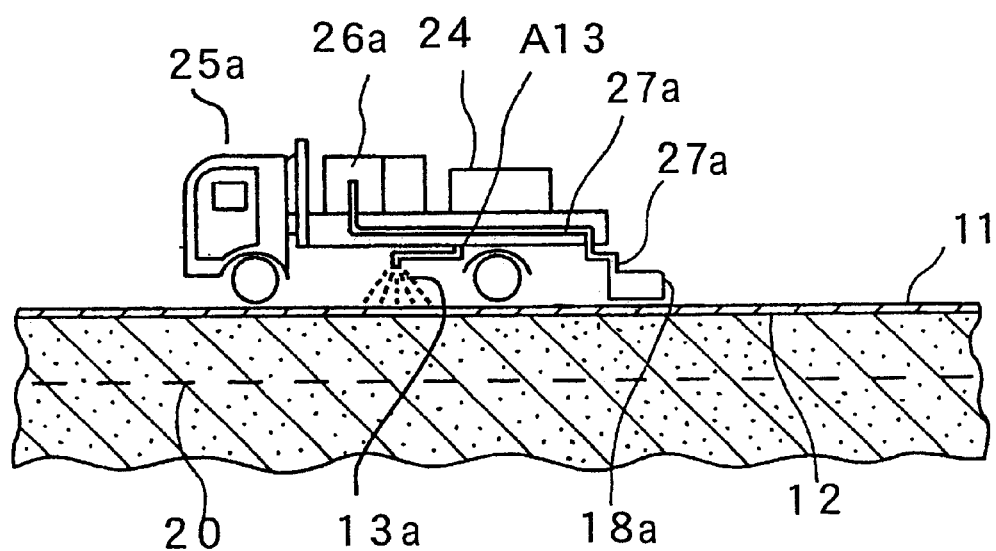
FIG. 9 is a side view illustrating an embodiment other than FIG. 8

For application of the invention, as shown as another example in FIG. 9, it is also possible to suck aggregated particles 21 and wash water remaining on the surface of drainage-type pavement layer 12 and in voids 18 formed therein immediately after spraying an aqueous solution of the aggregating agent 13, by use of a vacuum truck 25a having a vacuum pump 26a, a sucking pipe 27a and a sucking port 18a, for reuse as wash water.

EXAMPLE OF EXPERIMENT

A water permeability test was carried out on a plane area of 10 $m^2$ (1 m×10 m) on a road having a sectional structure shown in FIG. 10, executed in June, 1990 prior to filing the present application. Because of the lapse of a long period of time since execution, the plane surface of the road executed for the experiment had voids clogged off by stain. With a quantity of rain of 5 to 10 mm/hour, rain water was accumulated on the road surface, and a water flow was produced on the surface.

An aqueous solution of the above-mentioned aggregating agent (product name: EB-A) in an amount of 20 lit. was sprinkled onto the plane surface of 10 $m^2$ (1 m×10 m) on the aforementioned road. In this case, even with a quantity of rain of 10 to 20 mm/hour, rainwater did not stay on the road surface, penetrating into the road, and no water flow was produced.

Further, a similar aggregating agent in an amount of 2 to 3 lit./$m^2$ was sprinkled prior to rain fall onto another plane surface of 10 $m^2$ (1 m×10 m) on the same road and left as it was. Upon rainfall in the same quantity of rain, the same result was obtained.

What is claimed is:

1. A method of removing a stain from a paved road, comprising the steps of depositing an aqueous solution of an aggregating agent comprising a cationic linear organic polymer on a surface stain of the paved road, forming aggregated particles on the surface of the paved road, said aggregated particles comprising stain particles and said aggregating agent, and removing the stain in the form of aggregated particles from the surface of the paved road.

2. The method of claim 1, wherein said aqueous solution of the aggregating agent comprising the cationic linear organic polymer contains a salt.

3. The method of claim 1, wherein the aggregating agent comprises a composite compound of magnesium salt of dimethylaminoethyl acrylate-methacrylate copolymer and polyethyleneimine.

4. The method of claim 3, wherein the aggregating agent further comprises an alcoholic surfactant.

5. A method of removing stain particles from a paved road, comprising the steps of depositing an aqueous solution of an aggregating agent comprising a cationic linear organic polymer onto a surface of the paved road, forming aggregated particles on the surface of the paved road, said aggregated particles comprising said stain particles and said aggregating agent, and removing said aggregated particles comprising said stain particles and said aggregating agent from said paved road.

6. The method of claim 5, wherein said aqueous solution of the aggregating agent comprising the cationic linear organic polymer contains a salt.

7. The method of claim 5, wherein the aggregating agent comprises a composite compound of magnesium salt of dimethylaminoethyl acrylate-methacrylate copolymer and polyethyleneimine.

8. The method of claim 7, wherein the aggregating agent further comprises an alcoholic surfactant.

9. A method of removing stain particles from a structure selected from the group consisting of a road, a bridge, a gravestone, a fence, a guardrail, a building, a wall, a wood block, a stone-built construction, a concrete structure, tile, slate, glass plate, plastics, mortar and steel plate, comprising the steps of depositing an aqueous solution of an aggregating agent comprising a cationic linear organic polymer onto a surface of the structure, aggregating said stain particles adhered to, or settled into, the surface of said structure by an electrostatic action of said aggregating agent to form an aggregated stain comprised of said aggregating agent and said stain particles, and removing the aggregated stain from the surface of the structure with water.

10. The method of claim 9, wherein the structure is a paved road, further comprising the steps of pouring said water containing the aggregated stain into a gutter of the road, sucking up the water in the gutter, separating the aggregated stain from the water, and reusing the balance of the water.

11. The method of claim 9, wherein the structure is a paved road, further comprising the steps of sucking up the water containing the aggregated stain on the surface of the paved road, separating the aggregated stain from the water, and reusing the balance of the water.

12. The method of claim 9, wherein the aggregating agent comprises a composite compound of magnesium salt of dimethylaminoethyl acrylate-methacrylate copolymer and polyethyleneimine.

13. The method of claim 12, wherein the aggregating agent further comprises an alcoholic surfactant.

\* \* \* \* \*